March 7, 1944.   C. G. MILLER   2,343,469
AUTOMOTIVE DRIVE
Filed Jan. 20, 1942   2 Sheets-Sheet 1
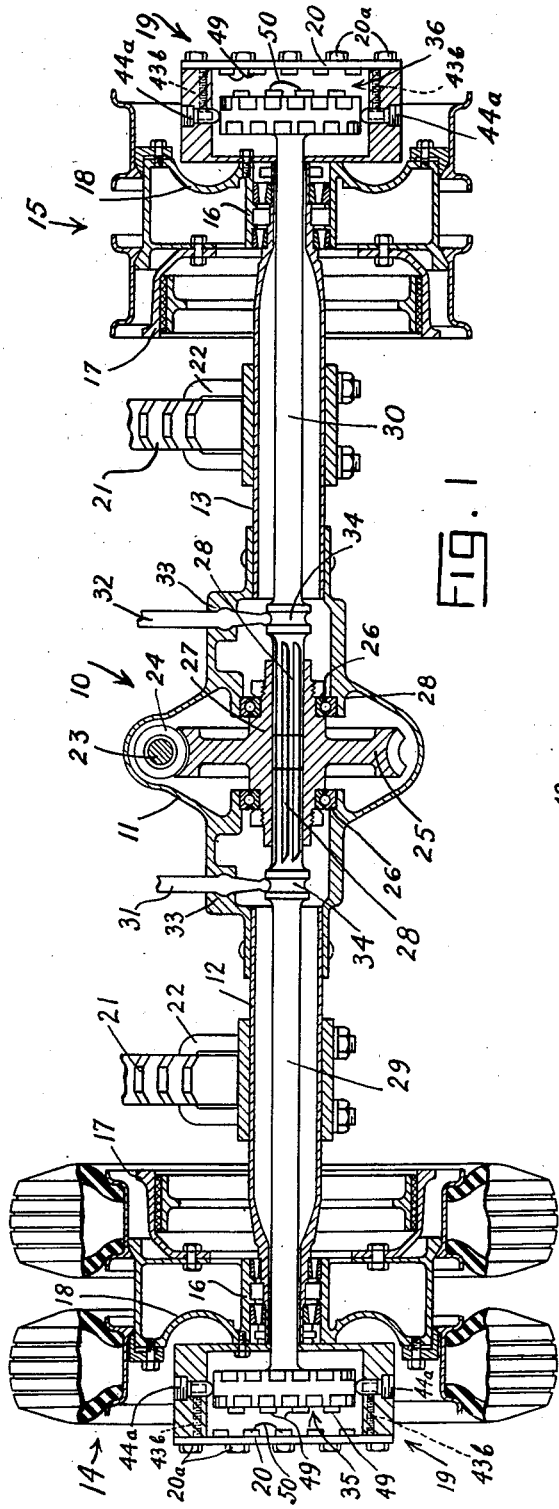
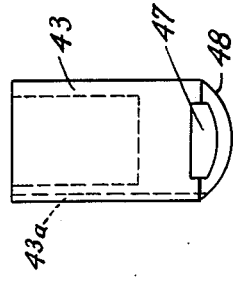
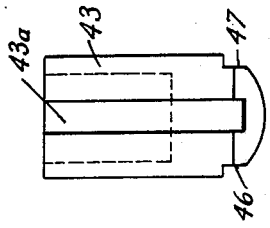
INVENTOR
CHARLES G. MILLER
BY
ATTORNEY

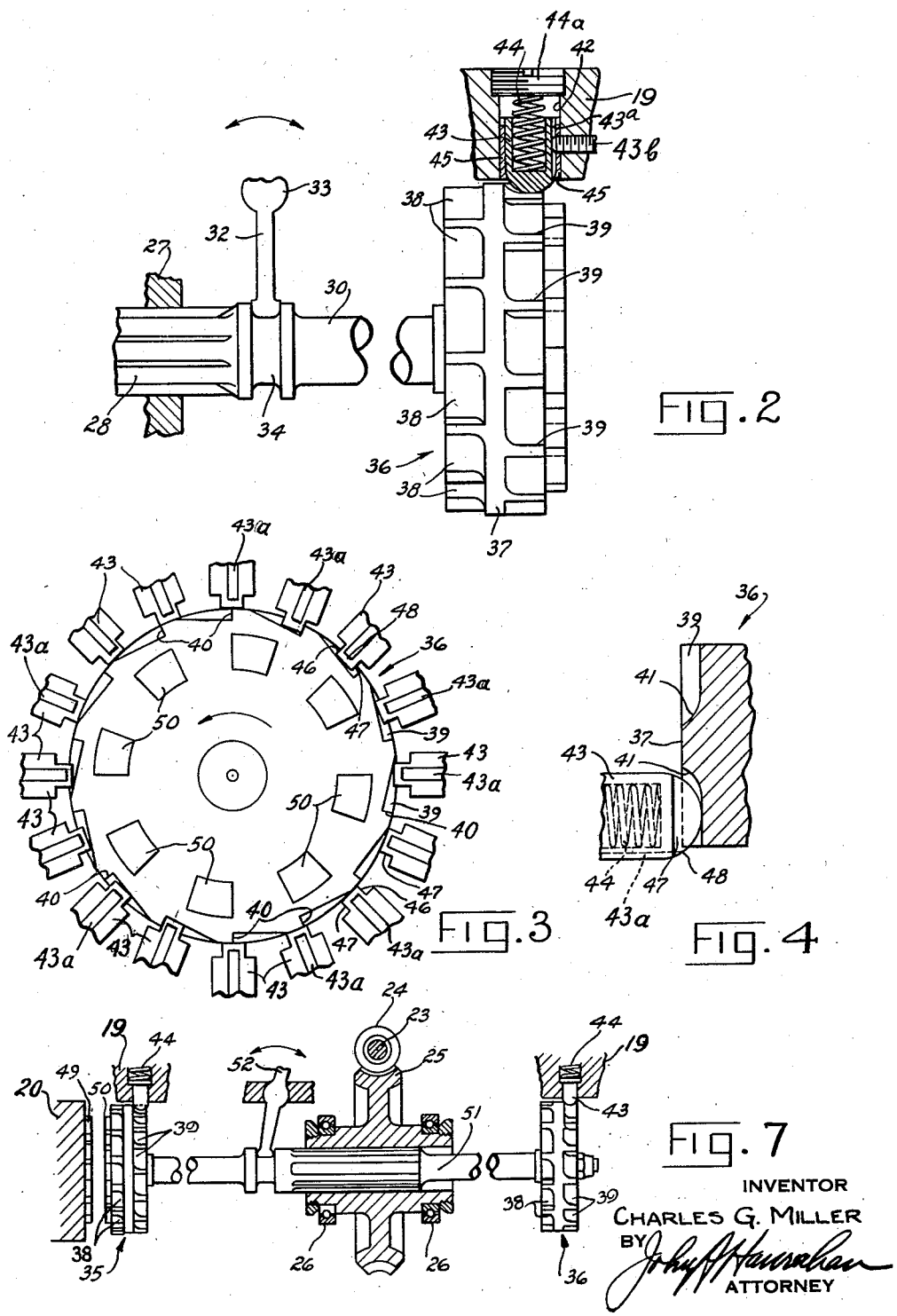

Patented Mar. 7, 1944

2,343,469

UNITED STATES PATENT OFFICE 2,343,469

AUTOMOTIVE DRIVE

Charles G. Miller, Easton, Conn.

Application January 20, 1942, Serial No. 427,400

11 Claims. (Cl. 192—50)

This invention relates to new and useful improvements in drives for motor vehicles and has particular relation to a drive wherein the usual differential mechanism is eliminated.

The objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings—

Fig. 1 is a vertical sectional view through an automotive drive constructed in accordance with the teachings of the invention;

Fig. 2 is an enlarged view partly in section and partly in elevation showing details of the drive;

Fig. 3 is a side elevational view on the scale of Fig. 2 and showing the pawl and ratchet means of that figure;

Fig. 4 is a detail sectional view taken transversely of the edge portion of Fig. 3;

Figs. 5 and 6 are enlarged elevational views taken at right angles to one another and showing a pawl employed; and Fig. 7 is a view somewhat similar to Fig. 1 but showing a slightly modified construction.

Referring in detail to the drawings and at first more particularly to Figs. 1 through 4 at 10 is shown any or the usual housing of the rear end of an automobile, as for example, of a bus, truck, tractor, or the like. Such housing includes a central portion 11 and oppositely directed but similar tubular extensions 12 and 13 at their outer ends rotatably mounting any or the usual vehicle driving wheels 14 and 15 respectively. Each such wheel includes any or the usual hublike portion 16, brake drum 17 and spokes 18 connecting the other parts with any or the usual tire carrying rims of the wheel.

Mounted on each wheel at its outer side beyond its hub 16 and the ends of the respective tubular housing portions 12 and 13 is a hollow hub 19 closed on its outer side by a plate 20, secured to such hub as by bolts or similar means 20a. The housing 10 and particularly the tubular extensions 12 and 13 thereof carry the vehicle body and any load therein, any or the usual springs 21 being interposed and secured to the housing extensions 12 and 13 by any or the usual means as the clips 22.

A propeller shaft 23 from any or the usual automotive transmission (not shown), extends into the housing portion 11 and there carries a worm 24 meshing with a worm gear 25 mounted in suitable bearings 26. With this arrangement it will be apparent that whenever the shaft 23 is being driven, the worm gear 25 will be driven and the latter will be driven in accordance with the direction and speed of the shaft 23, the driving of the latter being from any suitable motor (not shown) through any or the usual transmission as above mentioned. As the description proceeds, it will become apparent that the particular drive comprising the worm and worm gears is not essential to the invention and it will also be clear that the usual complicated differential gearing is dispensed with.

Gear 25 includes an internally splined hub 27 in which are received the inner correspondingly splined ends 28 of a pair of oppositely extending axle shafts 29 and 30 which pass through the tubular housing extensions 12 and 13 respectively and project slightly beyond the outer ends of said extensions and terminate in the hollow hubs 19 of the wheels 14 and 15 respectively. It will be apparent that the mentioned axle shafts are full floating. Said shafts may be shifted longitudinally but owing to the splined connection between the inner ends of the shafts and the hub 27 of gear 25, such shafts are rotated whenever said gear is being driven and are rotated in the direction in which the gear is turning.

Means are provided for adjusting the shafts longitudinally and as here shown such means includes levers 31 and 32 having a ball and socket mounting at 33 and each having its lower end engaged with a groove 34 in the axle shaft with which it is associated. Obviously, by rocking either lever, its associated shaft may be shifted or adjusted longitudinally and it will be clear that the shafts are independently adjustable through manipulation of the respective levers.

On their outer ends within the hubs 19, the shafts 29 and 30 carry similar heads generally designated 35 and 36 respectively. These heads comprise ratchets and since they are of identical construction, a detailed description of one will, it is believed, suffice for both. Head 36 (see Figs. 2, 3, and 4) comprises a solid block of metal having a continuous circumferential surface portion 37 midway its sides and at opposite sides of said portion has oppositely disposed sets of ratchet teeth 38 and 39. Fig. 3 being a side elevation of the head, shows the shape of the teeth 39 and it is noted that such teeth include a straight wall portion 40. Transversely each tooth includes a curved wall portion 41 merging with the bottom wall of the tooth and the surface 37. The teeth of the sets 38 and 39 are identical with the exception that the teeth of one set are in reverse relation to the teeth of the other set.

Mounted in the walls of the extra hubs 19 are a series of spring pressed pawls arranged radially but all in the same hub located in the same vertical plane. Each of these pawls is mounted in a socket or recess 42 in its hub and comprises a tubular portion 43 into which partially enters a coil spring 44. Such spring bears at its outer end against a threaded cap or plug 44a and thus constantly tends to project the pawl out of its socket 42 wherein a bushing 45 receives the pawl. The inner end of each pawl, or that end which is to be projected from the socket, is shown as a solid construction and includes a pair of flat opposite sides 46 and 47 and a pair of rounded sides 48. To prevent axial turning of the pawls and at the same time to provide an air bleed, each pawl has a groove 43a milled or otherwise formed in its side and into which enters the inner end of a screw 43b.

With the construction described when the shafts 29 and 30 are so adjusted that the heads 35 and 36 are in the positions of Fig. 1, the continuous peripheral surfaces 37 of the heads are aligned with the pawls of the respective hubs and the present drive is in neutral and there is no driving of the wheels 14 and 15 as the heads 35 and 36 may now rotate independent of the wheel hubs and what is more likely, the wheels are rotating and said heads are not. In Fig. 2 the parts are shown positioned as when an axle shaft has been adjusted to align the set of teeth 39 with the series of pawls of a hub.

Now as the head 36 is driven from the gear 25, the straight wall portions 40 of the teeth 39 will engage the flat side portions 47 of the pawls and drive the wheel hub mounting such pawls. If both hubs are adjusted the same, both of the wheels 14 and 15 will be driven in the same direction and at the same speed and in a positive manner. Should the wheels overrun the heads the bottom walls of the ratchet teeth will simply cam the pawls back into their sockets.

If it is desired to drive the vehicle in the opposite direction, the usual transmission is adjusted whereby the gear 25 will be rotated in the opposite direction and the shafts 29 and 30 are shifted longitudinally to dispose the set of ratchet teeth 38 in alignment with the series of pawls of the respective hubs. The teeth 38 being reversed to the teeth 39, the straight radial walls of teeth 38 will engage the flat sides 46 of the pawl ends and thereby drive the wheels. Should the wheels overrun the heads at this time, the pawls will simply be cammed back into their sockets by the inclined bottom walls of the teeth. Since the pawls have the rounded end portions 48, it is clear that such portions will simply cam against the inclined portions 41 of the teeth and cause the pawls to move back into their sockets whenever pressure is applied to the axle shafts to shift them longitudinally.

As shown there are a large number of pawls in each series and a large number of ratchet teeth in each set and there are, in fact, in each series two pawls in excess of the number of teeth in any set. Therefore, except when the wheel is over-running the ratchet there can be but a very slight independent movement of the wheel and ratchet head unless the head is so disposed that the pawls are aligned with the neutral or intermediate path 37. With the construction disclosed (see Fig. 3) two ratchet teeth and two pawls are always in engagement during driving of the wheels.

One advantage of my construction which is especially noted resides in the fact that the construction provides for the making of a very short turn by a vehicle. When such turn is desired, one axle shaft may be so adjusted as to dispose its head 35 or 36, as the case may be, with a set of teeth aligned with a series of pawls whereby one wheel will be driven in the desired direction and the other shaft may be adjusted to dispose its head in a neutral position. In this way a very short turn may be made. This would be particularly advantageous in a tractor construction used for farm work as for drawing a plow or the like.

The invention includes means whereby when a vehicle is descending a grade the driving wheels may be caused to drive the engine of the vehicle whereby to retard movement of the latter. The construction for this purpose includes a series of lugs 49 on the inner side of each plate 20 and a corresponding series of lugs 50 on the outer side of each head 35 and 36. With this construction when the shafts 29 and 30 are in their extreme outer positions, the lugs 50 are interlocked with the lugs 49 and thus the wheels 14 and 15 may not overrun and there is no free wheeling action.

Both shafts are not so adjusted at the same time since this would interfere with steering of the vehicle around curves but only one shaft is adjusted to the named position and the other shaft may be adjusted to a neutral position. The one shaft being adjusted to its extreme position, there is a positive connection between one wheel and the vehicle engine.

Attention is particularly directed to the fact that in the present instance, the hubs 19 of the wheels together with the pawls and the ratchet heads 35 and 36 are located at the outer sides of the wheels beyond the housing extensions 12 and 13. This construction results in my attaining the drive disclosed and yet retaining all the advantages of the full floating axle. The features of the invention may be incorporated in existing motor vehicles by substituting positive gearing for differential gearing or by welding operations on the latter and the additions of the levers 31 and 32 and the bolting of the hubs 18 to the existing wheels and the welding or otherwise securing of the heads 35 and 36 to the floating axles.

Fig. 7 shows a slight modification including the gearing above described and the heads 35 and 36 and the series of pawls but substituting for the two axle shafts a single shaft 51 to be longitudinally adjusted by the lever 52. With this construction both heads 35 and 36 are adjusted in the same direction at the same time and the lugs 49 and 50 are shown associated with one head only although the positive drive accomplished through such lugs is beneficial for the purpose of obtaining a braking effect on an engine while descending a down grade since when such lugs are engaged in the matter of one wheel, the other wheel is free to rotate relative to the wheel so engaged. It is noted in connection with the heads 35 and 36 of Fig. 5 that the sets of ratchet teeth 38 are at the left side of each head while the sets 39 are at the right sides of said heads to compensate for the fact that the heads are on the one shaft and are moved together.

Having thus set forth the nature of my invention, what I claim is:

1. In an automotive drive, a driven gear including an internally splined hub, a pair of oppositely extending shafts each having a splined end entering said hub whereby the shafts are rotatable therewith but may be shifted longitudinally with respect thereto, a stationary load supporting housing about said gear and said shafts, a wheel rotatably mounted on each outer end of said housing, each of said wheels including a hollow hub at its outer side beyond the end of said housing, said shafts extending beyond the ends of said housing, a ratchet wheel on the outer end of each of said shafts and located in said hollow hubs, pawl means carried by said hubs for cooperation with said ratchets for driving of said wheels by said shafts, and means for shifting said shafts longitudinally to carry said ratchets to and from driving relation with said pawls.

2. In an automotive drive, a pair of oppositely extending shafts shiftable in the directions of their length, means for positively rotating said shafts in any adjusted position of the latter, a stationary load supporting housing about said shafts, a wheel rotatably mounted on each outer end of said housing each of said wheels including a hollow hub at its outer side beyond the end of the housing, said shafts having their outer ends extending beyond the respective outer ends of said housing and into said hubs, a ratchet wheel on the outer end of each of said shafts and located in said hollow hubs, pawl means carried by said hubs for cooperation with said ratchets for driving said wheels from said shafts, and means for shifting said shafts longitudinally to carry said ratchets to and from driving relation with said pawls.

3. In an automotive drive, a stationary elongated load supporting housing, a rotatable floating axle shaft in said housing and projecting at one end thereof, a wheel mounted to turn on said end of said housing and including a hub portion at its outer side beyond the end of the housing and receiving the end of said shaft, a head carried by the outer end of the shaft within said hub and provided with oppositely disposed sets of ratchet teeth, a series of radially arranged pawls in said hub and all located in the same vertical plane for engagement with said teeth, said shaft longitudinally adjustable in said housing to selectively dispose said sets of ratchet teeth for engagement with said pawls, means for adjusting said shaft, and means for driving said shaft in any adjusted position thereof.

4. In an automotive drive, a stationary elongated load supporting housing, a floating axle shaft in said housing and projecting at one end thereof, a wheel mounted to turn on said end of said housing and including a hub at its outer side beyond the end of the housing and receiving the projecting end of the shaft, a head carried by the projecting end of the shaft within said hub and provided with oppositely disposed sets of ratchet teeth and with a portion between said sets of teeth, a series of radially arranged pawls in said hub and all located in the same vertical plane for engagement with said sets of teeth and the portion between the sets of teeth, said shaft longitudinally adjustable in said housing to selectively dispose said sets of ratchet teeth and said portion between said teeth for engagement with said pawls, and means for adjusting said shaft.

5. In an automotive drive, a pair of oppositely extending shafts shiftable in the directions of their length, means for positively rotating said shafts in any adjusted position of the latter, a stationary load supporting housing about said shafts, a wheel rotatably mounted on each outer end of said housing, each of said wheels including a hollow hub at its outer side beyond the end of the housing, said shafts having their outer ends extending beyond the respective outer ends of said housing and into said hubs, a ratchet wheel on the outer end of each of said shafts and located in said hollow hubs, pawl means carried by said hubs for cooperation with said ratchets for driving the wheels from said shafts, and means for independently shifting said shafts longitudinally to carry said ratchets to and from driving relation with said pawls.

6. In an automotive drive, a stationary elongated load supporting housing, a floating axle shaft in said housing and projecting at one end thereof, a wheel mounted to turn on said end of said housing and including a hub at its outer side beyond the end of the housing and receiving the projecting end of the shaft, a head carried by the projecting end of the shaft within said hub and provided with oppositely disposed sets of ratchet teeth and with a portion between said sets of teeth, a series of radially arranged pawls in said hub and all located in the same vertical plane for engagement with said sets of teeth and the portion between the sets of teeth, said shaft longitudinally adjustable in said housing to selectively dispose said sets of ratchet teeth and said portion between said teeth for engagement with said pawls, means for adjusting said shaft, and other means on said hub and said head and engageable on extreme adjustment of the shaft in one direction to positively engage the hub and head for movement together as a unit.

7. In an automotive drive, a stationary elongated load supporting housing, a rotatable floating axle shaft in said housing and projecting at one end thereof, a wheel mounted to turn on said end of said housing and including a hub portion at its outer side beyond the end of the housing and receiving the end of said shaft, selectively engageable forward and reverse driving connections between the ends of said shaft and said hub, said connections including pawl means carried by said hub and a head carried by said shaft and including ratchet means selectively engageable for forward and reverse driving of the hub by said shaft on longitudinal adjustment of the shaft relative to said housing, said head including a plain portion adapted to be disposed for engagement by said pawl means to permit of driving of said shaft without driving of said hub, means for adjusting said shaft longitudinally relative to said housing, and means for driving said shaft in any adjusted position thereof.

8. In an automotive drive, a stationary elongated load supporting housing, a rotatable floating axle shaft in said housing and projecting at one end thereof, a wheel mounted to turn on said end of said housing and including a hub portion at its outer side beyond the end of the housing and receiving the end of said shaft, selectively engageable forward and reverse driving connections between the ends of said shaft and said hub, said connections including pawl and ratchet means selectively engageable for forward and reverse driving of the hub by said shaft on longitudinal adjustment of the shaft relative to said housing, means for adjusting said shaft longitudinally relative to said housing, means independent of said pawl and ratchet means for driving said hub from said shaft, and means for driving said shaft in any adjusted position of the latter.

9. In an automotive drive, a pair of oppositely extending shafts shiftable in the directions of their length, means for positively rotating said shafts in any adjusted position of the latter, a stationary load supporting housing about said shafts, a wheel rotatably mounted on each outer end of said housing, each of said wheels including a hollow hub at its outer side beyond the end of the housing, said shafts having their outer ends extending beyond the respective outer ends of said housing and into said hubs, selectively engageable forward and reverse driving connections between the outer ends of said shafts and said hubs, said connections engageable depending on the positions of said shafts, means for independently shifting said shafts to engage the desired driving connections, and means independent of said forward and reverse driving connections for establishing driving connections between said shafts and said hubs on extreme adjustments of said shafts.

10. In an automotive drive, a pair of oppositely extending shafts shiftable in the directions of their length, means for positively rotating said shafts in any adjusted position of the latter, a stationary load supporting housing about said shafts, a wheel rotatably mounted on each outer end of said housing, each of said wheels including a hollow hub at its outer side beyond the end of the housing, said shafts having their outer ends extending beyond the respective outer ends of said housing and into said hubs, selectively engageable forward and reverse driving connections between the ends of said shaft and said hub, said connections including pawl means carried by said hub and oppositely disposed sets of ratchet means movable with said shaft and selectively engageable with said pawl means for forward and reverse driving of the hub by said shaft on longitudinal adjustment of the shaft relative to said housing, means for adjusting said shaft longitudinally relative to said housing, and plain surfaced means movable with said shafts into engagement with said pawl means to permit of rotation of said shafts independent of movement of said pawl means.

11. In an automotive drive, a pair of oppositely extending shafts shiftable in the directions of their lengths, means for positively rotating said shafts in any adjusted position thereof, a stationary load supporting housing about said shafts, a wheel rotatably mounted on each outer end of said housing, each of said wheels including a hollow hub at its outer end beyond the end of the housing, said shafts extending beyond the respective ends of said housing and having their outer ends disposed in the respective hollow hubs, a head carried by the projecting end of each shaft within its hub and provided with oppositely disposed sets of ratchet teeth and with a portion between said sets of teeth, a series of radially arranged pawls in each of said hubs, said pawls in the respective hubs located in the same vertical plane for engagement with said sets of teeth and the portions between the sets of teeth of the respective heads, and means for shifting said shafts independent of one another to selectively dispose the respective heads with said sets of teeth and said portions between said sets of teeth for engagement with said pawls.

CHARLES G. MILLER.